(12) United States Patent
Becchi

(10) Patent No.: US 6,328,289 B1
(45) Date of Patent: Dec. 11, 2001

(54) DEVICE FOR TREATING WATER IN A BASIN

(76) Inventor: Silvano Becchi, no. 5/A via Augera, 42023 Cadelbosco di Sopra (Reggio Emilia) (IT)

( * ) Notice: Subject to any disclaimer, the term of this patent is extended or adjusted under 35 U.S.C. 154(b) by 0 days.

(21) Appl. No.: 09/256,089

(22) Filed: Feb. 24, 1999

(30) Foreign Application Priority Data

Mar. 9, 1998 (IT) ............................................. RE98A0024

(51) Int. Cl.$^7$ ................................ B01D 47/16; C10J 1/18
(52) U.S. Cl. ...................... 261/84; 261/93; 261/DIG. 71
(58) Field of Search ......................... 261/84–93, DIG. 71

(56) References Cited

U.S. PATENT DOCUMENTS

| 3,109,288 | 11/1963 | Gross . | |
| 4,259,267 | 3/1981 | Wang . | |
| 4,732,682 | * 3/1988 | Rymal | ................................ 210/620 |
| 4,741,825 | * 5/1988 | Schiller | ................................ 210/170 |

FOREIGN PATENT DOCUMENTS

| 0 562 314 | 9/1993 | (EP) . |
| 1 248 837 | 11/1960 | (FR) . |

* cited by examiner

Primary Examiner—Chester T. Barry

(57) ABSTRACT

In a device (1) for treating waters in a basin, an operating group (8) is immersed in the water, being supported by two upper floats (3) or simply resting on the bottom of the basin. The operating group (8) has, defined inside it, a chamber inside which it is possible to create a pressure drop by means of a propeller (10) rotating outside the chamber. Two suction pipes (6), which lead to the chamber, emerge at the top above the free surface of the water. The operating group (8) is attached to a base structure (12) which is able to rest on the bottom of the basin. The device (1) may be used in particular to aerate and/or oxygenate (by means of movement) the waters contained in a basin, such as for example a tank for aquiculture, a fish-farming basin or an aeration tank of water purification plants.

11 Claims, 3 Drawing Sheets

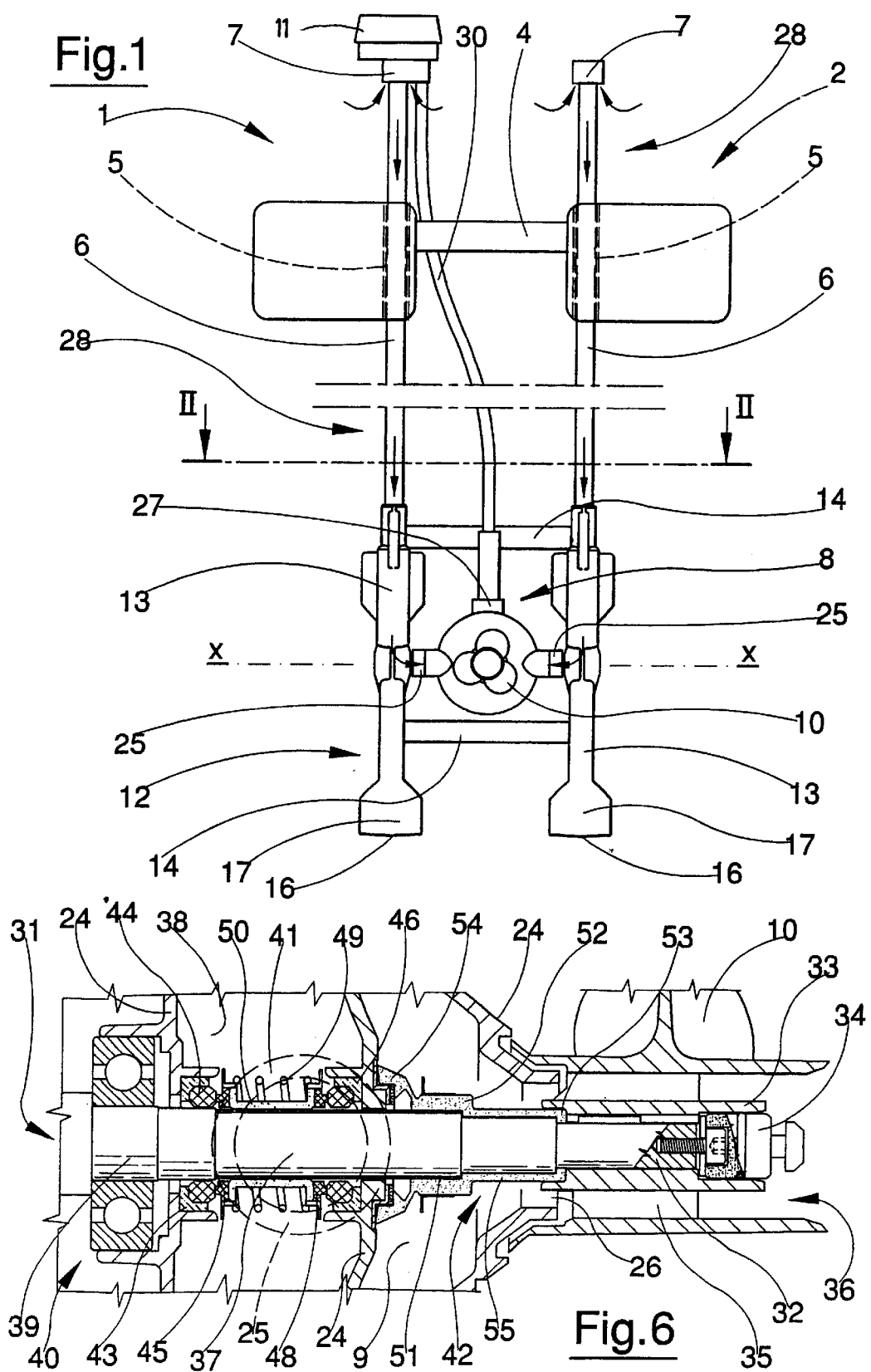

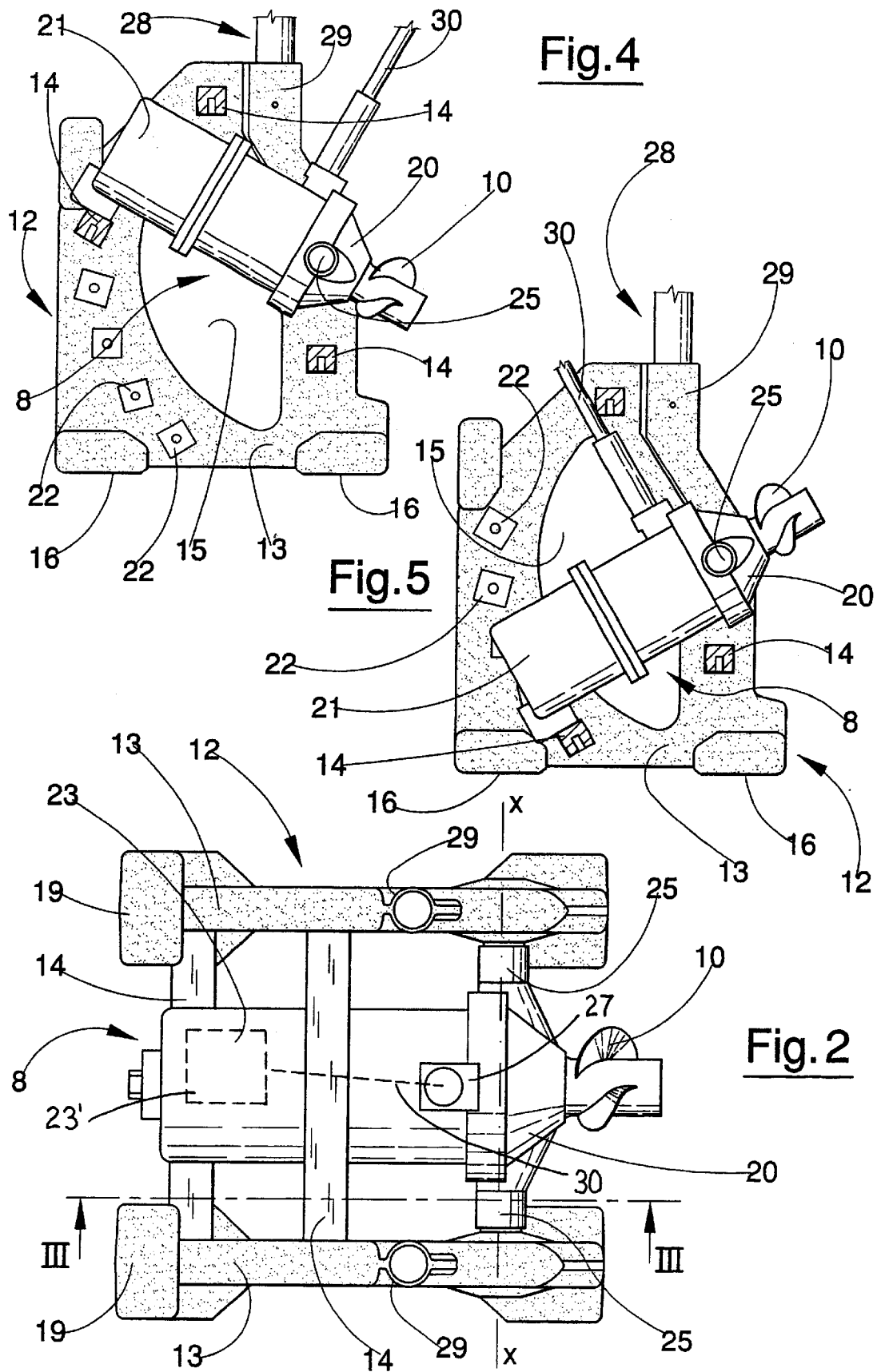

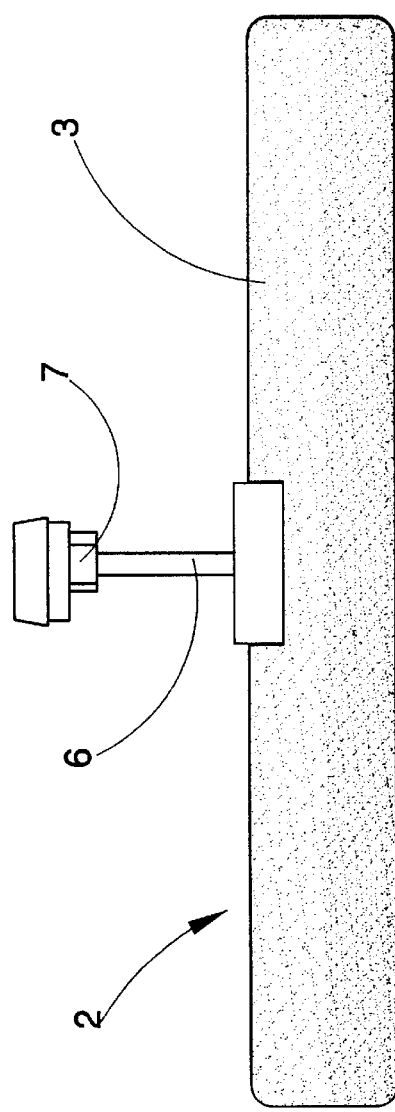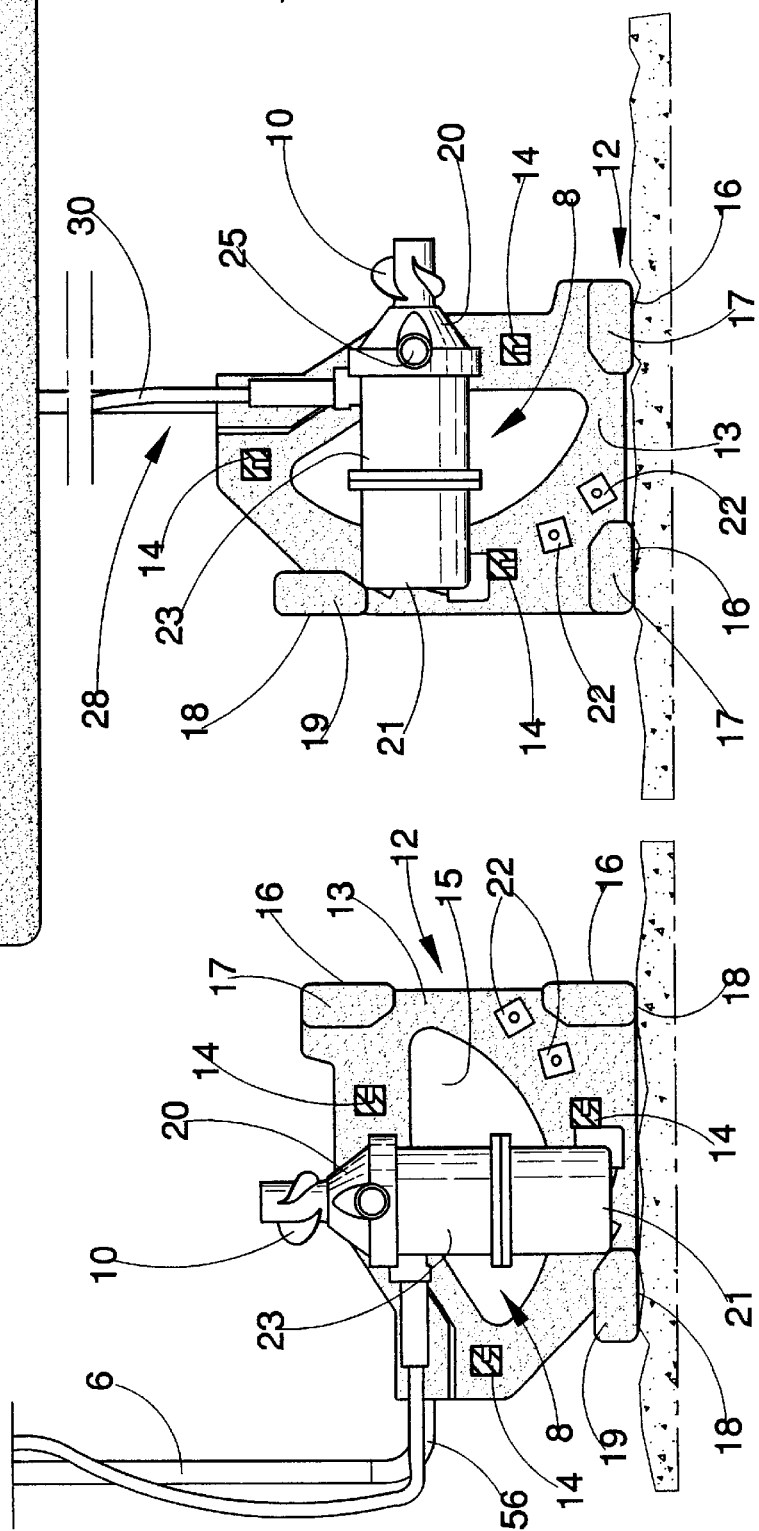

DEVICE FOR TREATING WATER IN A BASIN

BACKGROUND OF THE INVENTION

1. Field of the Invention

The present invention relates to a device for treating water in a basin.

More specifically, but not exclusively, the invention is advantageously used in different types of basins, such as, for example, tanks for aquiculture, fish-farming basins, aeration tanks of water purification plants, lakes undergoing reclamation, etc. The device in question may be used in particular for aerating and/or oxygenating the water, but it may also serve for other types of water treatment, such as, for example, stirring, degassing, destratification, de-icing, remixing, etc.

2. Description of the Prior Art

Various types of apparatus which perform the abovementioned tasks are already known; some of these are illustrated, for example, in the following patent publications: DE 3,417,039, EP 0,088,850, U.S. Pat. No. 4,157,304, U.S. Pat. No. 4,409,107, U.S. Pat. No. 4,514,343, U.S. Pat. No. 4,732,682, U.S. Pat. No. 4,741,825, U.S. Pat. No. 4,882,099, U.S. Pat. No. 4,954,295 and U.S. Pat. No. 5,118,450.

In particular the present invention refers to a device provided with an operating group immersed in the water and comprising a decompression chamber, a rotating propeller and a motor for driving the propeller. The decompression chamber has an inlet communicating with a suction duct which emerges above the free surface of the water, and an outlet immersed in the water; the propeller is situated outside the decompression chamber in the vicinity of the outlet. During use, operation of the propeller empties the decompression chamber of the water and causes, via the suction duct, sucking-in of air which is mixed with the water in the basin.

A device of this type is already known from the European publication EP 0,562,314 which illustrates a floating structure made of plastic material and comprising two parallel, hollow, floating cables underneath which the operating group is located. This device has, however, certain drawbacks.

Firstly, in the case where the level of the water inside the basin falls, the operating group may touch the bottom, with the consequent incorrect operation or breakdown of the device.

Secondly, when the device is outside the water—for example so that operations such as storage, transportation, checking, maintenance, etc., may be performed—the motor is exposed to accidental knocks with the risk of damage.

SUMMARY OF THE INVENTION

The object of the present invention is that of providing a device which is able to overcome the abovementioned drawbacks.

One advantage of the invention in question is that of providing a device which is particularly stable both inside and outside the water.

Another advantage is that, even when the device is outside the water, the operating group is protected against accidental knocks.

A further advantage is that of eliminating the risk that, in the event of a considerable drop in the level of the water inside the basin, the operating group may touch the bottom of the basin itself.

Yet another advantage is that, in a device constructed in accordance with the invention, it is possible to adjust easily, and over a wide range, the arrangement of the axis of rotation of the propeller; in particular, the device may selectively operate with the axis of the propeller horizontal, vertical or inclined at different angles.

A final advantage consists in the fact that the device is able to operate also without the aid of a floating structure, when it is simply rested on the bottom of the basin.

These objects and advantages are achieved by the invention in question, as is characterized by the claims indicated below.

BRIEF DESCRIPTION OF THE DRAWINGS

The invention is described below in detail with reference to the accompanying figures, which illustrate a preferred embodiment thereof.

FIG. 1 shows a schematic, partial, vertical elevation view of an example of embodiment of the device in question;

FIG. 2 shows, on a larger scale, a cross-section along the horizontal plane indicated by II—II in FIG. 1;

FIG. 3 shows, on a smaller scale, a cross-section along the plane indicated by III—III in FIG. 2;

FIGS. 4 and 5 show two different operating configurations of the device, with the operating group differently oriented;

FIG. 6 shows a detail of FIG. 3, on a larger scale and cross-sectioned;

FIG. 7 shows the device according to FIG. 3, slightly modified and in a different operating condition (tipped over), and resting on the bottom of the basin.

DETAILED DESCRIPTION OF THE PREFERRED EMBODIMENTS

With reference to the abovementioned Figures, 1 denotes in its entirety a device, constructed in accordance with the present invention, for treating a mass of water contained in a basin.

The device 1 comprises a floating structure 2 comprising two hollow, parallel and spaced floats 3 which are made of a plastic material and joined together by a horizontal flat element 4. The latter is made of plastic material and formed as one piece with the floats 3. The floating structure 2 has two sliding guides 5 with a vertical sliding axis. Each guide 5 is integral with a respective float 3. Two respective pipes 6 with a vertical axis are slidably coupled with the sliding guides 5. At the top, each pipe 6 terminates in an inlet mouth which is covered by a dome-shaped protection piece 7 which is open at the bottom. Each protection piece 7 prevents the entry, from above, of objects into the inlet mouth and at the same time allows the entry of air into the respective pipe 6 via the mouth itself, passing through an annular opening defined between the pipe and the associated protection piece, as indicated by the arrows F. Locking means, which are known and not shown, are provided for selectively fixing in position the pipes 6 with respect to the sliding guides 5.

The floating structure 2 was immersed in the water, an operating group indicated in its entirety by 8. The operating group 8 comprises at least: a decompression chamber 9, a rotating propeller 10 and a motor (known and not shown) for driving the propeller.

The device 1 also comprises a base structure 12 which is immersed in the water and to which the operating group 8 is attached. The bottom ends of the pipes 6 are rigidly engaged with the base structure 12.

Said structure 12 may be made of plastic material, for example the same material from which the floats 2 are made. The base structure 12 consists in the case in question in two lateral support elements 13 which are arranged alongside each other and substantially extend in a vertical plane and are specularly symmetrical.

These elements 13 are internally hollow, are parallel and spaced from one another and are joined together by one or more horizontal cross-pieces 14. Each support element 13 has in a central zone a weight-reducing opening 15, so that overall the shape of each element 13 is substantially annular. The operating group 8 is arranged in the space between the two support elements 13.

This base structure 12 is provided with at least three bottom resting points which are located underneath the operating group 8 and by means of which the device 1 may be rested on top of an external solid surface.

Each support element 13 is provided at the base with two support feet 17, the bottom surface of which is relatively wide and has at least one of the abovementioned resting points 16. Therefore, in the case in question, the base structure 12 has four support feet 17 with which at least one possible bottom resting point 16 is associated.

Externally, the base structure 12 is provided with at least three lateral resting points 18 which are situated alongside the operating group 8 and by means of which the structure 12 may be laid with one side on top of an external solid surface, as illustrated in FIG. 7. In this particular case, there are at least four lateral resting points 18, two of which are arranged on the side surface of two bottom support feet 17; another two lateral resting points 18 are arranged on another two further support feet 19 which are located laterally on the top zone of the two support elements 13. The abovementioned lateral resting points 18 are situated on the opposite side to the propeller 10.

The operating group 8 has at least two ends 20, 21 which are joined to the base structure 12. In the particular case, a first end 20 is rotatably coupled to the base structure 12, with the axis of rotation x—x preferably horizontal, and a second end 21 can be positioned on the base structure. In particular the second end 21 is removably fixed to one of the cross-pieces 14 which join the two support elements 13. The position of this cross-piece 14 and the second end 21 of the operating group associated with it is adjustable: for this purpose, the opposite ends of this cross-piece 14 may be fixed to the support elements 13 in a plurality of different positions: in fact, a plurality of fastening points 22 are positioned on an arc of a circle, with which points the ends of the cross-piece 14 may be engaged. These fastening points 22 are present on both the support elements 13 and are arranged circumferentially around the axis of rotation x—x of the operating group 8.

The operating group 8 comprises a cylindrical part 23 which is sealingly closed with respect to the exterior and contains a known motor 23' which can be of the electric or fluid-operated type. The decompression chamber 9 is defined by the walls of a casing 24. This chamber 9 has at least one inlet 25 and at least one outlet 26. In the case in question the chamber 9 has two opposite side inlets 25.

Each side inlet 25 communicates with a suction duct 28 comprising a channel 29 formed inside a respective support element 13. Each channel 29 has an end communicating with the decompression chamber 9 and an opposite end communicating with one of the two vertical pipes 6 which emerge above the free surface of the water. The bottom end of each pipe 6 is attached to a respective support element 13 and has a mouth communicating with the channel 29 inside said element. Therefore the suction ducts 28 are formed, at least partly, inside the base structure 12.

A water-tight container 11 contains electrical power supply terminals of the electric cable 30 which penetrates inside the casing 24 of the motor by means of the sealed connector 27.

The outlet 26 of the decompression chamber is immersed in the water. The rotating propeller 10 is situated completely outside the decompression chamber 9 in the vicinity of the outlet 26. The side inlets 25 of the decompression chamber are situated in the vicinity of the axis x—x about which the operating group 8 is able to rotate. The propeller 10 is connected to the motor by means of a shaft 31 which passes through the decompression chamber 9.

One end 32 of the shaft 31 is integrally joined, by means of keying, to a hub 33 which carries the propeller 10 and which is situated opposite the outlet 26 of the decompression chamber. This end 32 of the shaft has a sealed-closing cap 34 which is housed inside a cavity of the hub 33 and is designed to prevent infiltration of water into the space between the joining surfaces of the shaft 31 and the hub 33. The latter has, inside it, channels 35 with their axis parallel to the axis of rotation of the propeller 10 and arranged circumferentially about said axis. These channels 35 connect the decompression chamber 9 to an air outlet opening 36 which is formed centrally inside the hub 33.

The shaft 31 has a first section 37 which is surrounded by an annular chamber 38 sealingly closed and delimited by walls of the casing 24. The annular chamber 38 is intended to contain a lubricating fluid (oil). The shaft 31 also has a second section 39 which acts as a pivot for rotation and which has, coupled to it, a rolling support 40 consisting for example of a conventional ball-bearing system. The first section 37 of the shaft is located between the end 32 with the hub 33 and the second section 39 with the rolling support 40. The first section 37 has, mounted on it, first sealing means 41 which are designed to close off sealingly the annular chamber 38 full of oil both from the decompression chamber 9 and from the rolling support 40. The decompression chamber 9 has, arranged inside it, second sealing means 42 which are designed to close off further in a sealing manner the connection between the annular chamber 38 and the decompression chamber 9.

The first sealing means 41 comprise: a first annular gasket 43 which is made of elastomeric material, is fixed and has an L-shaped cross-section and is seated so as to make contact with the shoulder of the casing 24; a first ring 44 which is made of ceramic material, is fixed and seated in the cavity of the first annular gasket 43; a first annular sealing member 45 which is made of graphite, is rotationally integral with the shaft 31 and is intended during use to form a sliding-contact seal against the first ring 44. The first sealing means 41 also comprise a group of elements which is composed of a second annular gasket 46, a second ring 47 and a second annular sealing member 48 which are identical and symmetrical with respect to the similar elements 43, 44, 45 indicated previously. A resilient member 49 (spring) and a sleeve 50 made of elastomeric material are arranged between the two groups of elements. The resilient member 49 ensures the sliding contact between the rings 44, 47 made of ceramic material and the annular sealing members 45, 48 made of graphite. The resilient sleeve 50 surrounds coaxially a section of the shaft 31. A tubular-shaped lining sheath 51, made of nylon, snugly lines the external surface of a portion of the shaft 31.

The second sealing means 42 comprise an annular element 52 which is preferably made of rigid plastic (Teflon) and which lines a part of the shaft 31 and is rotationally integral with the latter. One end 53 of the annular element 52 is gripped with contact between the hub 33 and the shaft 31, while the opposite end has an annular lip 54 which makes sealing contact against a fixed surface of the casing 24. A middle part 55 of the annular element 52 surrounds, with contact, an end part of the tubular lining sheath 51. The cap 34 and the annular element 52 co-operate so as to protect the shaft 31 from contact with the water contained in the basin: it is possible to provide, as an addition or as an alternative, other means which are able to insulate, from the water, the end of the shaft which carries the propeller 10 and which passes through the decompression chamber 9: it has been found that the use of insulating means reduces considerably corrosion phenomena affecting the shaft itself.

During use, the motor causes rotation of the propeller 10, resulting in the water which initially fills the decompression chamber 9 being sucked out. The latter is emptied of the water. A drop in pressure occurs inside the chamber 9, with the consequent suction of air (and/or oxygen and/or substances) from outside through the various suction ducts 6, 29, 30. The sucked air, to which oxygen is added if necessary, is then sucked up through the channels 35 in the hub 35 and then mixed with the mass of water contained in the basin.

FIG. 7 shows a particular operational configuration of the device, in which the operating group 8 is arranged with the axis of rotation of the propeller 10 vertical: in this case the base structure 12 is rotated through 90° with respect to the configuration in FIG. 3 and is connected to the vertical suction pipes 6 by means of 90° elbow connectors 56 which can be removably fitted if required.

In the case where the water level in the basin drops considerably, the base structure 12 is able to rest, with its bottom support feet 17, on the bottom of the basin, so that the operating group 8 never manages to touch the bottom itself, thus eliminating the risk of damage or malfunctions. It is also possible to use the device 1 without the need for a top floating structure 2: in this case the base structure 12 is rested on the bottom of the basin and the operating group 8 is able to operate, since it is nevertheless located at a distance from the bottom itself. The motor is preferably mounted on supports made of elastomeric material, mainly with the aim of reducing the vibrations when the device, during operation, is not floating on the water, but is resting on a solid surface.

In the case where the operational configuration is the one tipped over on its side as shown in FIG. 7, the bottom support is provided by the resting points 18 which are situated laterally on the opposite side to the propeller 10.

As is known, by sliding the pipes 6 along the respective guides, it is possible to adjust the depth at which the operating group 8 is located, while keeping the top end of the pipes themselves above the free surface of the water. It is also possible to adjust the orientation of the operating group 8 in a vertical plane: FIGS. 4 and 5 show, purely by way of example, two different possible orientations of the operating group 8 in a vertical plane.

The adjustment of the depth and the orientation of the operating group allow the device to be used to perform various functions such as, for example, aeration, degassing, circulation, destratification and de-icing.

Owing to the base structure 12, the operating group 8 can be supported with a considerable degree of stability. The base structure 12, moreover, being floating per se, helps lighten the weight of the device in the water. The base structure 12 also provides protection for the operating group 8 when the device is not in the water; in this connection it must be pointed out that the operating group 8 is enclosed within the dimensions of the base structure 12 both in the vertical and in the horizontal direction.

Finally, owing to the structure 12, the operating group 8 is also able to function without the aid of the floats, when said structure is simply rested on the bottom, as for example shown in FIG. 7. In this case, the suction ducts 28 may simply emerge slightly above the free surface of the water, without being attached to any floating structure.

Obviously the constructional details of the invention may be subject to numerous other modifications of a practical and applicational nature, without thereby departing from the protective scope of the inventive idea claimed below.

What is claimed:

1. A device for treating water in a basin, comprising an operating group (8) immersed in the water and comprising:
    a decompression chamber (9) having at least one inlet (2), which communicates with at least one suction duct (28) which emerges above the free surface of the water, and at least one outlet (26) which is immersed in the water;
    a rotating propeller (10) situated outside the decompression chamber (9) In the vicinity of the outlet (26), and a motor for driving the propeller (10); wherein the device further comprises:
    a base structure (12) to which the operating group (8) is attached and which is provided with at least three bottom resting points (16) which are situated underneath the operating group (8) and by means of which the device may be rested on top of a solid surface such as ground or a bottom of a basin;
    wherein the base structure (12) has two lateral support elements (13) on which the resting points are engaged and which are arranged alongside each other in respective vertical planes and are specularly symmetrical and rigidly connected together;
    wherein at least a part (29) of the suction duct is formed inside the base structure (12); and
    wherein the operating group (8) has at least two ends (20, 21) attached to the base structure (12).

2. The device as claimed in claim 1, wherein the operating group (8) has a first end (20) which is rotatably coupled to the base structure (12) on a horizontal axis of rotation (x—x), and a second end (21) which can be positioned on said structure (12) so to have a variable positional orientation.

3. The device as claimed in claim 2, wherein the second end (21) is integrally connected to a cross-piece (14) intended to engage, at ends thereof, with any one of a plurality of pairs of retaining seats (22) which are respectively positioned on each of the two lateral support elements (13).

4. The device as claimed in claim 2, wherein the inlet (25) of the decompression chamber (9) is situated in a vicinity of the axis of rotation (x—x) of the operating group (8).

5. The device as claimed in claim 1, wherein the base structure (12) is provided with at least three lateral resting points (18) which are situated alongside the operating group (8) and by means of which said structure (12) may be placed on one side on top of a solid surface.

6. The device as claimed in claim 5, wherein said lateral resting points (18) are situated symmetrically on the opposite side to the propeller (10).

7. The device as claimed in claim 1, wherein the base structure (12) comprises two lateral support elements (13)

which are specularly symmetrical, parallel, spaced from one another and joined by at least one cross-piece (14) and between which the operating group (8) is arranged.

8. The device as claimed in claim 1, wherein the propeller (10) is connected to the motor by means of a shaft (31) which passes through the decompression chamber (9); one end (32) of the shaft being integrally joined to a hub (32) which carries the propeller (10) and which is located opposite the outlet (26) of the decompression chamber (9); a first section (37) of the shaft which is arranged between said end (32) and a second section (39) of the shaft which acts as a pivot for rotation is surrounded by an annular chamber (38); the first section (37) of the shaft has, mounted thereon, first sealing means (41) which are rotationally integral with the shaft (31) so as to close off sealingly the annular chamber (38) both from the decompression chamber (9) and from a rolling support (4) which is coupled to the second section (39) of the shaft; the decompression chamber (9) has, arranged inside thereof, second sealing means (42) which are rotationally integral with the shaft (31), so as to close off further in a sealing manner the annular chamber (38) from the decompression chamber (9).

9. The device as claimed in the preceding claim 1, wherein the operating group (8) comprises a shaft (31) which has a first section (37) surrounded by an annular chamber (38) which is sealingly closed and delimited by walls of a casing (24), the annular chamber (38) being intended to contain oil as a lubricating fluid.

10. The device as claimed in the preceding claim 9, wherein a tubular-shape lining sheath (51) which is made of nylon snugly lines an external surface of a portion of the shaft (31), and a further annular element (52), which is made of rigid plastic and rotationally integral, lines a second part of the shaft (31), co-operating with an end cap (34) so as to protect the shaft (31) from contact with the water of the basin.

11. The device as claimed claim 1, wherein the base structure (12) is associated with an upper floating structure (2).

* * * * *